UNITED STATES PATENT OFFICE.

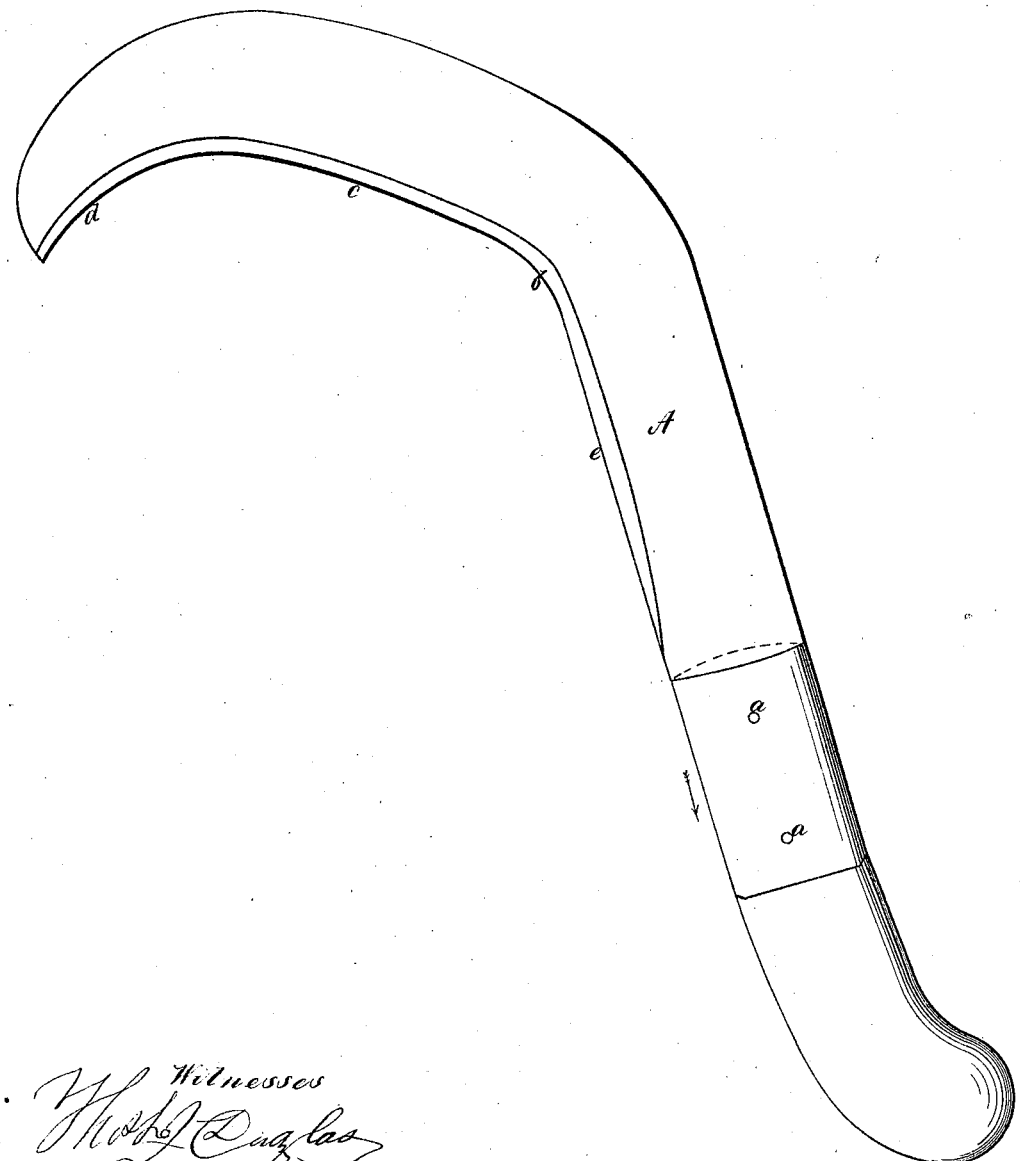

AARON TRAVIS, OF PEEKSKILL, NEW YORK.

IMPROVEMENT IN PRUNING-HOOKS.

Specification forming part of Letters Patent No. 40,869, dated December 8, 1863.

*To all whom it may concern:*

Be it known that I, AARON TRAVIS, of Peekskill, in the county of Westchester and State of New York, have invented a new and Improved Pruning-Hook; and I do hereby declare that the following is a full, clear, and exact description of the same, reference being had to the accompanying drawing, forming a part of this specification.

The drawing represents a side elevation of my invention.

This invention relates particularly to the shape of the pruning-hook; and it consists in running the cutting-edge from the handle in a straight line up to about two-fifths (more or less) of its entire length, and turning it off at an angle of about one hundred and thirty-five degrees, whereby an inclined plane is produced, which finally ends in a short hook, in such a manner that in applying said cutting-edge to a twig or branch of a tree, or to a stalk of corn or other plants, a draw cut is produced and the operation of cutting performed with less power than with a hook of the ordinary shape.

To enable those skilled in the art to make and use my invention, I will proceed to describe it.

A represents a hook, made of steel, or iron and steel combined, in the ordinary manner. It is secured to its handle by means of screws passing through holes *a*. The cutting-edge of the hook commences about three-quarters of an inch above the upper hole, and it extends in a straight line, *e*, from the handle to a point, *b*, where it turns off at an angle of about one hundred and thirty-five degrees, (more or less,) thereby forming an inclined plane, *c*, which terminates in a short hook, *d*.

In applying the cutting-edge to a twig, branch, or stalk, the straight part *e* begins to cut slightly as it is drawn along on the surface of said branch or stalk, but as soon as the inclined plane *c* of the cutting-edge comes into action a strain on the handle in the direction of the arrow marked near it in the drawing produces a draw cut, causing the cutting-edge to pass through the branch or stalk with the greatest ease. In case the skin should not be completely severed by the inclined plane, the hook *d* will easily complete the cutting operation.

The operation of my hook differs materially from that of an ordinary pruning-hook with a curved cutting-edge. In starting to cut with an ordinary hook, the cutting-edge slips over the skin of the branch or stalk to be cut until it reaches a portion in the curve the radius of which is parallel, or nearly so, with the direction of the power applied to the handle, and the cutting has now to be performed by main force, or, in other words, the cutting-edge has to be forced through the article to be cut without any longitudinal or drawing motion. It is therefore impossible with such a hook to cut small twigs or branches or the stalks of corn without holding the outer end of said branch or stalk, and in case a twig on a tree is to be cut which cannot be reached from the ground the cutting can only be performed by striking at said twig with the hook, and thereby the tree is liable to be injured rather than benefited.

With my hook the operation of cutting can be performed in the easiest manner by applying the cutting-edge to the article to be cut and drawing it quickly over its surface and through it. There is no need of using both hands and no danger of injuring a tree or cutting the wrong branch or twig, and, furthermore, the operation can be performed with less exertion than it can with a hook of the ordinary shape and construction.

What I claim as new, and desire to secure by Letters Patent, is—

A pruning-hook, A, constructed in the form herein shown, with the cutting-edge on the various parts *e*, *c*, and *d*, as set forth.

AARON TRAVIS.

Witnesses:
THOS. S. J. DOUGLAS,
GEO. W. REED.